United States Patent [19]

Horikawa et al.

[11] Patent Number: 5,464,637
[45] Date of Patent: Nov. 7, 1995

[54] EGG CONTAINING IRON OR VITAMIN $D_3$ IN HIGH CONTENT

[75] Inventors: Hiroshi Horikawa, Tochigi; Eiji Honzawa, Saitama; Tadahiro Masumura; Akira Fukazawa, both of Tochigi, all of Japan

[73] Assignee: C. Itoh Feed Mills Co., Ltd., Tokyo, Japan

[21] Appl. No.: 296,353

[22] Filed: Aug. 25, 1994

Related U.S. Application Data

[63] Continuation of Ser. No. 20,647, Feb. 22, 1993, abandoned.

[30] Foreign Application Priority Data

Feb. 27, 1992 [JP] Japan ................................. 4-040977
Mar. 19, 1992 [JP] Japan ................................. 4-063228

[51] Int. Cl.⁶ ........................... A23K 1/175; A23K 1/18
[52] U.S. Cl. ................... 426/2; 426/74; 426/614; 426/807
[58] Field of Search .................... 426/2, 72, 74, 426/623, 630, 807, 614

[56] References Cited

U.S. PATENT DOCUMENTS

| 2,382,193 | 8/1945 | Whitmoyer | 426/807 |
| 2,683,664 | 7/1954 | Greer | 426/807 |
| 4,115,552 | 9/1978 | Hamill | 424/118 |
| 4,209,518 | 6/1980 | Mine | 424/250 |
| 5,085,871 | 2/1992 | Horikawa | 426/2 |

OTHER PUBLICATIONS

English abstract J63148937-A (Jun. 21, 1988), Japan.

*Primary Examiner*—Michael W. Ball
*Assistant Examiner*—Daniel J. Stemmer
*Attorney, Agent, or Firm*—McAulay Fisher Nissen Goldberg & Kiel

[57] ABSTRACT

A composition which improves iron deficiency, which comprises an egg containing 8 to 15 mg of iron per 100 g of yolk and which improves bone composition, which comprises an egg containing 500 to 3000 IU of vitamin $D_3$ per 100 g of egg yolk.

8 Claims, No Drawings

EGG CONTAINING IRON OR VITAMIN D₃ IN HIGH CONTENT

This is a continuation of application Ser. No. 08/020,647, filed Feb. 22, 1993, now abandoned.

BACKGROUND OF THE INVENTION

This invention relates to an egg containing iron or vitamin $D_3$ in a high content. Iron is one of the nutrients tending to be deficient, particularly for woman. It was reported that about 50% of adult women and about 70% of senior high school woman students are deficient in iron, containing latent iron deficiencies, and therefore, supplementation of iron is necessary ("Nippon Naika Gakkai Hokoku (Japanese Internal Medicinal Society Report)" 1988) In the case of pregnant women, iron requirement is increased, and it is necessary to take iron about twice as much as an ordinary person. Iron requirement per one day for Japanese people (Ministry of Health and Welfare) is shown in Table 1.

TABLE 1

Iron Requirement (Ministry of Health and Welfare)

| Age (years old) | Iron (mg/l day) | |
| --- | --- | --- |
| | Man | Woman |
| 0 | 6 | 6 |
| 1 | 7 → 8 | 7 → 8 |
| 6 | 9 → 10 | 9 → 10 |
| 11 | 12 | 12 |
| 20 | 10 | 12* |
| 60 | 10 | 10 |
| Pregnant Woman in the first half period | — | 15 |
| Pregnant Woman in the latter half period | — | 20 |
| Lactation Period | — | 20 |

*After menopause: 10 mg

Incidentally, iron is a mineral resistant to absorb, and only about 10% of intake is absorbed. Particularly, recent foods contain phosphorus additives abundantly, and persons deficient in iron are further increased by the inhibition of the additives from the absorption of iron. Under such conditions, it is necessary to supplement iron in some form for women, particularly pregnant women. Thereupon, various foods for iron supplement have been proposed.

However, the above foods for iron supplement are processed foods wherein inorganic iron agent was added, and therefore, iron absorbability is inferior. Iron agent is also supplied as a medicine to remedy anemia, and in that case, an adverse reaction to reduce gastric functions tends to occur.

The applicants have already developed a feed containing a ferrous salt of organic acid obtained by dissolving an organic acid having reducing action together with a ferrous salt, and the feed was fed to egg-producing chickens (Japanese Patent KOKAI No. 63-148937). By feeding the feed, egg production rate and tail picking trouble were improved, but the improvement in iron content of egg has not been known yet.

On the other hand, it is known that, when vitamin $D_3$ is deficient, persons fall into rickets because calcification of bones does not proceed normally. That is, vitamin $D_3$ is necessary for the absorption of calcium (Ca) through intestines. When the vitamin is deficient, Ca absorbability is reduced resulting in the inhibition of bone calcification. When vitamin D is insufficient, however calcium is taken abundantly, most of the calcium taken is excreted without use resulting the occurrence of calcium deficiency.

There are two representative kinds of vitamin D which are $D_2$ and $D_3$. Vitamin $D_3$ has Ca absorption effect on mammals and birds, but vitamin $D_2$ does not have the effect on birds.

Foods containing vitamin D are unevenly distributed which are fish meats, the yolk of chicken egg, milk and the like among animal foods and shiitake mushroom among vesitable foods. The other foods contain no or only very small amount of vitamin D.

On the other hand, skin contains vitamin $D_3$ precursor which is converted to vitamin $D_3$ by ultraviolet irradiation in the sunlight. However, the conversion is not so much in the people whose indoor life is long, such as aged people, and in the people who lives in the district where sunshine time is short. The supplementation of vitamin D is necessary for such a people. Furthermore, bone fracture increases among infants and young people, and the necessity increases for babies and infants to take vitamin D sufficiently who are in the growth stage of bones. Moreover, aged people increases recently. It is said that aged persons, particularly post menopaused women, tend to suffer from osteoporosis wherein bones become fragile and are liable to be fractured, and in 2000 A.D., about 35% of women 60–64 years old, 50% of women not less than 65 years old will suffer from osteoporosis. Thus, the remedy of this disease becomes an important problem as a national disease.

As mentioned above, vitamin D performs a very important role in human body, and now, vitamin D requirement is 400 IU/day for baby, infant (not more than 5 years old), 100 IU/day for young person (not less than 6 years old) adult, and 400 IU/day for pregnant woman, lactating woman.

However, it is difficult for babies, infants, pregnant women and lactating women to take 400 IU vitamin D necessary therefor from foods. In order to take the above amount of vitamin D, 14 eggs or 3 liters of milk must be taken per one day, and such an amount of egg or milk cannot be taken through usual meals. Accordingly, vitamin D must be supplemented by taking a medicine containing various vitamins. In U.S. and Canada, there is a milk fortified by about 400 IU of vitamin $D_3$ per one pack (1 l) for the purpose of the supplementation of vitamin D.

The applicant have already developed an egg containing vitamin $D_3$ in a high content by feeding bile acid and not less than 400 IU/day of vitamin $D_3$ to egg-producing chickens (Japanese Patent KOKAI No. 4-11849).

SUMMARY OF THE INVENTION

An object of the invention is to provide a composition which improves iron deficiency which contains iron component in a high content being excellent in absorbability without an adverse reaction to reduce gastric functions.

Another object of the invention is to provide a method of producing the above egg.

The applicants have investigated in order to achieve the above objects, and found that, when ferrous organic acid salt having reducing action and casein phosphopeptide to feed for egg-producing chicken together with inorganic iron salt, iron content of egg yolk remarkably increases, and the iron component is excellent in absorbability without an adverse reaction to reduce gastric functions.

Thus, the present invention provides a composition which has achieved the above object, which comprises an egg containing 8 to 15 mg of iron per 100 g of yolk, and a method of producing the egg which comprises feeding a feed containing 0.1 to 1 wt. % of an inorganic iron salt, 0.001 to 0.1 wt. % of a ferrous organic acid salt having reducing action and 0.001 to 0.1 wt. % of casein phosphopeptide to egg-producing chicken.

Another object of the invention is to provide a composition which improves bone composition which contains vitamin $D_3$ in a high content capable of supplementing a necessary amount of vitamin D for baby, infant, pregnant woman and lactating woman. The composition is harmless, and accelarates ossification and bone growth resulting in the prevention of bone fracture, osteoporosis and the like.

The applicants have investigated in order to achieve the above object, and found that an egg containing vitamin $D_3$ in a high content meets the above object.

Thus, the present invention also provides a composition which as achieved the above object, which comprises an egg containing 500 to 3000 IU of vitamin $D_3$ per 100 g of egg yolk.

DETAILED DESCRIPTION OF THE INVENTION

The composition which improves iron deficiency comprises an egg containing iron component in the yolk in a high content.

The iron content of egg yolk is 8 to 15 mg, preferably 9 to 12 mg, per 100 g of the yolk which can be converted to 1.5 to 2.7 mg, preferably 1.6 to 2.2 mg, per one egg. The iron content of conventional egg yolk is stable, and is about 6.5 mg per 100 g of yolk.

In the invention, the iron content is increased by adding ferrous organic acid salt having reducing action and casein phosphopeptide together with inorganic iron salt to feed for egg-producing chicken.

The inorganic iron salt is dissolved by digestive fluid, such as gastric juice having a pH of 3–4, of chicken, and suitable inorganic iron salts are ferrous sulfate, ferrous carbonate, ferrous chloride, ferric sulfate, ferric carbonate, ferric chloride, and the like. A suitable inorganic iron salt content of the feed is 0.1 to 1 wt. %, preferably 0.3 to 0.6 wt. %, which can be converted to 0.04 to 0.4 wt. %, preferably 0.1 to 0.2 wt. % as iron content. When the inorganic iron salt content is less than 0.1 wt. %, the iron amount becomes insufficient for obtaining the iron enriched egg of the invention. When the content is more than 1 wt. %, breeding results, such as egg production yield and weight increase, are degraded.

The ferrous ion in the ferrous organic acid salt having reducing action is stabilized by the organic acid having reducing action contained therein, and is kept in the divalent sate for a long period. Suitable organic acids are ascorbic acid, erythoruvic acid, nordihydroguaiaretic acid, gallic acid and the like. The organic acid may be in a form of ferrous salt or in a form of adduct or the like. In the case of the salt, it may be a double salt with other organic acid or inorganic acid. Examples of the other organic acid include citric acid, tartaric acid and succinic acid. Examples of the inorganic acid include hydrochloric acid, sulfuric acid, phosphoric acid and carbonic acid. Two or more kinds of the ferrous organic acid salt may be combined.

The ferrous organic acid salt can be prepared as follows. In the case of double salt, according to the method disclosed in Japanese Patent KOKAI No. 58-156539, an organic acid having reducing action is added to dissolve into an aqueous solution of a ferrous other organic acid or inorganic acid salt, and if necessary, pH of the solution is adjusted. Then, the solution is concentrated to crystalize the double salt, or to be dried followed by powdering. In the case of the salt composed of ferrous organic acid alone, known salt manufacturing methods are applicable, and a simple method is of using ion-exchange resin. In this method, for example, an organic acid having reducing action is added to an aqueous solution of a ferrous strong acid salt, and then, a prescribed amount of a basic ion-exchange resin in a free form is added to remove the strong acid by adsorption. A commercial powder product is sold by Minato Sangyo K.K. in the name of "ANICO" which contains 24.6 wt. % of Fe and is manufactured by adding L-ascorbic acid to ferrous sulfate aqueous solution, dissolving and then drying the solution.

A suitable content of the ferrous organic acid salt having reducing action is 0.001 to 0.1 wt. %, preferably 0.003 to 0.01 wt. %.

Casein phosphopeptide (CPP) is a hydrolyzate of casein, and it is a phosphopeptide having an active site to bind to calcium. There are three kinds of casein, i.e., α-casein, β-casein and α-casein, and every one may be used for the feed. With respect to casein phosphopeptide, there are some reports, and it has been elucidated that the hydrolyzate of α-casein decomposed with trypsin is the peptide chain portion of $Asp^{43}$-$Lys^{79}$, and the hydrolyzate of β-casein decomposed with trypsin is the peptide chain portion of N-terminal-$Arg^{25}$ However, the casein phosphopeptide to be added may be any other one having an active site to bind to calcium and a molecular weight being absorbable from the intestinal tract of chicken. The active site to bind to calcium is now considered the portion of

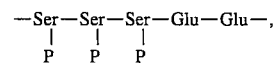

and the molecular weight may be less than about 10,000. The decomposition method for producing casein phosphopeptide is not restricted, however, preferable methods use a protease not decomposing the active site, such as pepsin or trypsin. A suitable casein phosphopeptide content of the feed is 0.001 to 0.3 and 0.005 wt. % is preferred.

The other components of the feed may be the same as a conventional feed for egg-producing chicken, and include a protein source, an energy source, a calcium source, a phosphorus source, vitamins, minerals and the like blended so as to satisfy NCR requirement. The protein source is fish meal, soybean cake, rapeseed cake, feather meal, meat bone meal or the like, and amino acids such as DL-methionine, L-tryptophan, L-lysine or L-threonine may be added for the complement of amino acid imbalance. As the energy source, there are carbohydrates, such as corn, milo and wheat flour, and fats, such as fat for feed, soybean oil and powder fat. As the calcium source, there is calcium carbonate. The feed contains about 12 to 25 wt. % of crude protein, about 3 to 10 wt. % of crude fats, about 0.8 to 4 wt. % of calcium and about 2,700 to 3,300 kcal/kg of ME.

The blending order of the inorganic iron salt, the ferrous organic acid salt and casein phosphopeptide is not limited, and they may be added simultaneously.

The feeding method of the feed egg-producing to chicken may also be conventional.

The composition which improves bone composition comprises an egg containing 500 to 3,000 IU, preferably 1,000 to 2,000 IU, of vitamin $D_3$ per 100 g of egg yolk, which can be converted to 90 to 500 IU, prererably 180 to 360 IU, of vitamin $D_3$ per one egg.

The vitamin $D_3$ enriched egg can be obtained by adding vitamin $D_3$ and bile acid to a conventional feed as above so as to contain 4,000 to 20,000 IU, preferably 5,000 to 10,000 IU, of vitamin $D_3$ and 0.01 to 0.5 wt. %, preferably 0.05 to 0.2 wt. %, of bile acid. Bile acid is added in order to remove troubles caused by the abundant intake of vitamin $D_3$, and a suitable amount is 0.05 to 1 g, preferably 0.1 to 0.5 g, per one day. By blending vitamin $D_3$ and bile acid in addition to the inorganic iron salt, the ferrous organic acid salt and casein phosphopeptide, an egg enriched by vitamin $D_3$ as well as iron can be obtained.

The composition which improves iron deficiency and the composition which improves bone composition may be in a state of raw egg, or processed by heating, drying, concentration, powdering, granulating or the like. Either of the compositions may be egg itself, or blended with other component, such as excipient or binder. In the case of containing other component, a suitable content of the egg is 10 to 60 wt. %, preferably 20 to 30 wt. %.

The form of the compositions may be tablet, powder or liquid, and can be taken as it is or used as food additive.

Since iron requirement to be taken is 10 mg/day for man and 12 mg/day for woman which is calculated based on that iron absorption rate is 10%, the shortage of iron which is estimated about 10% of the requirement (1–1.2 mg) can be compensated by taking one iron-enriched egg of the invention. On the other hand, the necessary amount of vitamin $D_3$ for baby, infant, pregnant woman and lactating woman can be taken by eating two vitamin D3-enriched eggs of the invention.

The iron and vitamin $D_3$ contained in the egg of the invention have been taken by chicken, and they are excellent in absorbability and in no adverse reaction.

EXAMPLES

EXAMPLE 1

0.5 wt. % of ferrous sulfate, 0.01 wt. % of a ferrous ascorbate ("ANICO" containing 24.6 wt. % of Fe, Minato Sangyo K.K.) and 0.3 wt. % of casein digestion product ("CPP-I" containing 12 wt. % of casein phosphopeptide, Meiji Seika Kaisha Ltd.) were added to a commercial feed for egg-producing chicken ("CI Hispec", C. Itoh Feed Mills), and uniformly mixed.

In a comparison, the above commercial feed ("CI Hispec") was used in Conventional Example 1. 0.5 wt. % of ferrous sulfate was added to the commercial feed ("CI Hispec"), and it was used in conventional Example 2. 0.01 wt. % or 0.05 wt. % of "ANICO" was added to the commercial feed ("CI Hispec"), and used in Comparative Examples 1 and 2. 0.1 wt. % or 0.3 wt. % of the casein digestion product ("CPP-i") was added to the commercial feed ("CI Hispec"), and used in Comparative Examples 3 and 4. 0.5 wt. % of ferrous sulfate and 0.65 wt. % of "ANICO" were added to the commercial feed ("CI Hispec"), and used in Comparative Example 5. 0.5 wt. % of ferrous sulfate and 0.3 wt. % of "ANICO" were added to the commercial feed ("CI Hispec"), and used in Comparative Example 6.

Using the above feeds, each 7 white leghorns of 320 days old were bred for 30 days up to 349 days old, and iron content of egg yolk was measured at 15th day and 30th day. The results are summarized in Table 2.

TABLE 2

| | Feed (wt. %) | | | | Fe Content in Egg Yolk (mg/100 g) | |
|---|---|---|---|---|---|---|
| | Commercial Feed | $Fe_2SO_4$ | ANICO | CPP-1 | 15th day egg | 30th day egg |
| Example 1 | O | 0.5 | 0.01 | 0.3 | 7.90 (121.5) | 7.91 (120.8) |
| Conventional 1 | O | — | — | — | 6.50 (100) | 6.55 (100) |
| Conventional 2 | O | 0.5 | — | — | 6.90 (106.2) | 6.94 (106.0) |
| Comparative 1 | O | — | 0.01 | — | 7.10 (109.2) | 7.17 (109.5) |
| Comparative 2 | O | — | 0.05 | — | 7.40 (113.8) | 7.40 (113.0) |
| Comparative 3 | O | — | — | 0.1 | 6.70 (103.1) | 6.70 (102.3) |
| Comparative 4 | O | — | — | 0.3 | 6.90 (106.2) | 6.90 (105.3) |
| Comparative 5 | O | 0.5 | 0.05 | | 7.45 (114.6) | 7.50 (114.5) |
| Comparative 6 | O | 0.5 | | 0.3 | 7.00 (107.7) | 7.02 (107.2) |

Numerals in parenthesis indicate relative values calculated employed as the iron content in the yolk of egg obtained in Conventional Example 1 rendered 100.

The iron content of the yolk of eggs obtained at 15th day and 30th day in Example 1 was increased by 15 to 20% compared with the eggs obtained in Conventional Example 1 using a usual commercial feed and the eggs obtained in conventional Example 2 using a usual commercial feed wherein ferrous sulfate was added as iron agent. Accordingly, it is apparent that the addition of ferrous organic acid salt having reducing action and CPP is effective for increasing iron content of egg. The iron content of the yolk of eggs obtained at 15th day and 30th day in Example 1 was increased by 6% to 17% compared with the eggs obtained in Comparative Examples 1 and 2 wherein only the ferrous organic acid salt having reducing action added to the commercial feed and the eggs obtained in Comparative Examples 3 and 4 wherein only CPP was added. Accordingly, it is apparent that both of to blend the ferrous organic acid salt having reducing action and CPP is more effective than to blend either one. Furthermore, the iron content of the yolk of eggs obtained at 15th day and 30th day in Example 1 was increased by 5% to 12% compared with the eggs obtained in Comparative Example 6 wherein a combination of ferrous sulfate and "ANICO" was added. Accordingly, it is apparent that to blend a combination of the ferrous organic acid salt having reducing action and CPP in addition to inorganic iron salt is more effective than the combination of CPP and inorganic iron salt alone.

Breeding was continued using other hens in the same method as Example 1 and Conventional Example 1, and iron content of egg yolk was measured at 40th day, 60th day and 90th day. The results are shown in Table 3.

TABLE 3

| | Fe Content in Egg Yolk | | |
|---|---|---|---|
| | 40th day egg | 60th day egg | 90th day egg |
| Example 1 | 9.11 (142) | 10.80 (166) | 10.72 (165) |
| Conventional 1 | 6.40 (100) | 6.52 (100) | 6.48 (100) |

As shown in Table 3, by breeding longer than 2 months, the iron content was increased more than 1.5 times of conventional egg.

EXAMPLE 2

0.5 wt. % of ferrous sulfate, 0.005 wt. % of a ferrous ascorbate ("ANICO" containing 24.6 wt. % of Fe, Minato Sangyo K.K.) and 0.1 wt. % of casein digestion product ("CPP-I" containing 12 wt. % of casein phosphopeptide, Meiji Seika Kaisha Ltd.) were added to a commercial feed for egg-producing chicken ("CI Hispec", C. Itoh Feed Mills) containing 19 wt. % of crude protein and 5 wt. % of crude fats, and uniformly mixed.

The above feed was fed to egg-producing eggs in an amount of 110 to 120 g/day/chicken everyday, and produced eggs were collected from 60th day, and lyophilized by a conventional manner to obtain lyophilized iron-enriched egg. The composition of main components of the egg is shown in Table 4. In a comparison, the composition of lyophilized conventional egg is also shown in Table 4.

TABLE 4

| Main Component | Lyophilized Iron-Enriched Egg | Lyophilized Conventional Egg |
|---|---|---|
| Crude Protein (wt. %) | 46.2 | 47.6 |
| Crude Fat (wt. %) | 36.7 | 35.5 |
| Iron (mg/100 g) | 11.1 | 6.0 |

6 female ICR mice immediately after weaning (3 weeks old) were preliminarily bred for 2 weeks using the feed used in Comparative Example 8 shown in Table 5.

After the preliminary breeding, the mice were bred for 2 weeks using the feed shown in Table 5. In the feed, the lyophilized iron-enriched egg was blended as the composition for improving iron deficiency.

In a comparison, using the same feed as Example 2 except that the lyophilized conventional egg shown in Table 4 was blended instead of the lyophilized iron-enriched egg, mice were bred as Comparative Example 7, similar to Example 2.

Using a commercial feed shown in Table 5, mice were bred as Comparative Example 8, similar to Example 2. In the feed, neither the lyophilized iron-enriched egg nor the lyophilized conventional egg was blended.

Using a commercial feed (Comparative Example 9) for mouse (Oriental Yeast) wherein inorganic iron salt was added shown in Table 5, mice were bred through the preliminary breeding and test breeding.

TABLE 5

| | | Comparative Examples | | |
|---|---|---|---|---|
| Feed | Example 2 | 7 | 8 | 9 |
| Corn Starch | 30 wt. % | 30 wt. % | 30 wt. % | |
| Casein | 22 | 22 | 27 | |
| Cellulose Powder | 5 | 5 | 5 | |
| Sucrose | 26 | 26 | 26.5 | |
| Soy Bean Oil | 1 | 1 | 5.5 | |
| Minerals | 4 | 4 | 4 | |
| Vitamin Mixture | 2 | 2 | 2 | |
| Lyophilized Iron-Enriched Egg | 10 | — | — | |
| Lyophilized Conventional Egg | — | 10 | — | |
| Crude Protein (wt. %) | 24.4 | 24.5 | 24.3 | 24.6 |
| Crude Fat (wt. %) | 5.6 | 5.8 | 5.5 | 5.6 |
| Iron (mg/100 g) | 14.1 | 9 | 4 | 122 Inorganic Ion |

Body weight, hematocrit value and iron content of liver of each mouse were measured before and after the test breeding, and the results are shown in Table 6.

TABLE 6

| | Example 2 | Comparative 7 | Comparative 8 | Comparative 9 |
|---|---|---|---|---|
| Body Weight (g) | | | | |
| Finish of Preliminary Breeding | 22.1 | 21.9 | 22.0 | 21.8 |
| Finish of Test Breeding | 25.8 | 25.3 | 25.4 | 25.5 |
| Body Weight Increase | 3.8 | 3.5 | 3.4 | 3.8 |
| Hematocrit Value (n = 6) | 43.7 | 43.0 | 42.3 | 45.0 |
| Iron Content of Liver (mg/kg) | 112.8 | 99.5 | 107.1 | 116.3 |

As shown in Table 6, it was confirmed that hematocrit value and iron content of liver of the mice bred in Example 2 were more than those bred in Comparative Examples 7 and 8, and iron absorption of the mice in Example 2 was better than those in Comparative Example 9.

EXAMPLE 3

Vitamin $D_3$ and bile acid were added to a commercial, feed for egg-producing chicken ("CI Hispec", C. Itoh Feed Mills) to prepare a feed containing 8,000 IU/kg of vitamin $D_3$, 0.1 wt. % of bile acid, 19 wt. % of crude protein and 5 wt. % of crude fat, and uniformly mixed.

The above feed was fed to egg-producing eggs in an amount of 110 to 120 g/day/chicken everyday, and produced eggs were collected from 60th day, and lyophilized by a conventional manner to obtain lyophilized vitamin $D_3$-enriched egg. The composition of main components of the egg is shown in Table 7. In a comparison, the composition of lyophilized conventional egg is also shown in Table 7.

TABLE 7

| Main Component | Lyophilized V $D_3$-Enriched Egg | Lyophilized Conventional Egg |
|---|---|---|
| Crude Protein (wt. %) | 46.2 | 47.6 |

TABLE 7-continued

| Main Component | Lyophilized V $D_3$-Enriched Egg | Lyophilized Conventional Egg |
| --- | --- | --- |
| Crude Fat (wt. %) | 36.7 | 35.5 |
| Vitamin $D_3$ (IU/100 g) | 900 | 150 |

6 female ICR mice immediately after weaning (3 weeks old) were preliminarily bred for 2 weeks using the feed used in Comparative Example 10 shown in Table 8.

After the preliminary breeding, the mice were bred for 2 weeks using the feed shown in Table 8. In the feed, the lyophilized vitamin $D_3$-enriched egg was blended as the composition for improving bone composition.

In a comparison, using the same feed as Example 3 except that the lyophilized conventional egg shown in Table 7 was blended instead of the lyophilized vitamin $D_3$-enriched egg, mice were bred as Comparative Example 7, similar to Example 3.

Using a commercial feed shown in Table 8, mice were bred as Comparative Example 11, similar to Example 3. In the feed, neither the lyophilized vitamin $D_3$-enriched egg nor the lyophilized conventional egg was blended.

TABLE 8

| | | Comparative Examples | |
| --- | --- | --- | --- |
| Feed | Example 2 | 10 | 11 |
| Corn Starch | 30 wt. % | 30 wt. % | 30 wt. % |
| Casein | 22 | 22 | 27 |
| Cellulose Powder | 5 | 5 | 5 |
| Sucrose | 26 | 26 | 26.5 |
| Soy Bean Oil | 1 | 1 | 5.5 |
| Minerals | 4 | 4 | 4 |
| Vitamin Mixture*[1] | 2 | 2 | 2 |
| Lyophilized V $D_3$-Enriched Egg | 10 | — | — |
| Lyophilized Conventional Egg | — | 10 | — |
| Crude Protein (wt. %) | 24.4 | 24.5 | 24.3 |
| Crude Fat (wt. %) | 5.6 | 5.8 | 5.5 |
| Vitamin $D_3$ (IU/kg) | 900 | 150 | — |
| Ca (wt. %) | 0.48 | 0.48 | 0.46 |
| P (wt. %) | 0.37 | 0.47 | 0.39 |

*[1] Not containing vitamin D

Body weight, thighbone weight, and ash, calcium and phosphorus of thighbone of each mouse were measured before and after the test breeding, and the results are shown in Table 9.

TABLE 9

| | Example 3 | Comparative 10 | Comparative 11 |
| --- | --- | --- | --- |
| Body Weight (g) | | | |
| Finish of Preliminary Breeding | 22.1 | 22.0 | 21.9 |
| Finish of Test Breeding | 25.8 | 25.4 | 25.3 |
| Body Weight Increase | 3.8 | 3.4 | 3.5 |
| Thighbone | | | |
| Weight (mg) | 66.7 | 66.9 | 67.7 |
| Ash (wt. %) | 35.2 | 33.3 | 32.6 |
| Ca (wt. %) | 9.0 | 8.2 | 7.8 |
| P (wt. %) | 6.2 | 5.6 | 5.1 |

As shown in Table 9, a significant difference could not be found as to the body weight and thighbone weight between Example 3 and Comparative Examples 10, 11. However, as to thighbone components, those of Example 3 were significantly increased compared with Comparative Examples 10, 11.

I claim:

1. A method of producing an egg containing 8 to 15 mg of iron per 100 g of yolk, which comprises feeding a feed containing 0.1 to 1 wt. % of an inorganic iron salt, 0.001 to 0.1 wt. % of a ferrous organic acid salt consisting of a ferrous salt and an organic acid 0.1 having reducing action and 0.001 to 0.3 wt. % of casein phosphopeptide to egg-producing chicken.

2. The method of claim 1 wherein the inorganic iron salt is selected from the group consisting of ferrous sulfate, ferrous carbonate, ferrous chloride, ferric sulfate, ferric carbonate and ferric chloride.

3. The method of claim 1 wherein the organic acid having reducing action is selected from the group consisting of ascorbic acid, erythoruvic acid, nordihydroguaiaretic acid and gallic acid.

4. The method of claim 1 wherein the inorganic iron salt is ferrous sulfate and the organic acid having reducing action is ascorbic acid.

5. The method of claim 1 wherein the content of the ferrous organic acid salt is 0.003 to 0.01 wt. %.

6. The method of claim 1 wherein casein phosphopeptide is added as a casein digestion product.

7. The method of claim 1 wherein the content of casein phosphopeptide is 0.005 to 0.05 wt. %.

8. The method of claim 1 wherein the feed also contains 12 to 25 wt. % of crude protein, 3 to 10 wt. % of crude fats, 0.8 to 4 wt. % of calcium and 2,700 to 3,300 kcal/kg of ME.

* * * * *